United States Patent [19]

Sato et al.

[11] Patent Number: 4,972,222
[45] Date of Patent: Nov. 20, 1990

[54] EXPOSURE CONTROLLING APPARATUS FOR CAMERA

[75] Inventors: Toshihiro Sato, Tokyo; Tadao Takagi; Keiji Ohsawa, both of Yokohama, all of Japan

[73] Assignee: Nikon Corporation, Tokyo, Japan

[21] Appl. No.: 346,403

[22] Filed: May 2, 1989

[30] Foreign Application Priority Data

May 13, 1988 [JP] Japan ............................... 63-116724
May 16, 1988 [JP] Japan ............................... 63-120092

[51] Int. Cl.[5] .............................................. G03B 7/08
[52] U.S. Cl. ..................................... 354/432; 354/286
[58] Field of Search ................................ 354/432, 286

[56] References Cited

U.S. PATENT DOCUMENTS

Re. 32,376  3/1987  Fukuhara et al. .................. 354/432
4,636,054  1/1987  Saegusa .............................. 354/432

FOREIGN PATENT DOCUMENTS

0123030  9/1979  Japan ................................. 354/432

Primary Examiner—Russell E. Adams
Attorney, Agent, or Firm—Shapiro and Shapiro

[57] ABSTRACT

An exposure controlling apparatus for a camera, comprises a divided photometry device for performing photometry regarding an object field through a taking lens by dividing the object field into a plurality of areas, a central portion photometry device for performing photometry regarding a central area of the object field through the taking lens, a lens information output device for outputting lens information representative of a quantitive optical feature of the taking lens, a comparison device, including reference value information, for comparing the lens information with the reference value information, and an exposure determination means, responsive to the comparison device, for determining an exposure value regarding the object field in accordance with the divided photometry device when the lens information does not exceed the reference value information, and for determining an exposure value regarding the object field in accordance with the central portion photometry device when the lens information exceeds the reference value information.

14 Claims, 9 Drawing Sheets

EXPOSURE CONTROLLING APPARATUS FOR CAMERA

BACKGROUND OF THE INVENTION

1. Field of the Invention

The present invention relates to an exposure controlling apparatus for cameras, and more particularly, it relates to an exposure controlling apparatus for a camera, wherein a divided photometry mode or a central portion photometry mode can be selected.

2. Related Background Art

A conventional exposure controlling apparatus of a camera is provided with a photometry means arranged in a camera finder, which photometry means measures incident luminous flux introduced into the camera through a taking lens and permits a divided photometry (i.e., a so-called multi-pattern photometry) for performing photometry regarding an object field (picture) by dividing the field into at least a central portion and a peripheral portion, and a central portion photometry for performing photometry regarding the central portion of the field, whereby an operator can select the divided photometry mode or the central portion photometry mode freely by means of an external selection means.

For example, it has been proposed to divide the object field into five areas, one of which is a central portion area of the field and the others of which correspond to four areas obtained by dividing a peripheral portion encircling the central portion, and to employ five photometry light receiving devices arranged in a mosaic pattern. If such photometry light receiving devices are arranged, for example, in a finder of a single lens reflex camera in which taking lenses can be changed, depending upon the positions where the photometry light receiving devices are arranged, when the full aperture F value is large, the amount of light from the peripheral portion of the field to the photometry light receiving devices will be insufficient. As a result, in the divided photometry mode which uses the whole object field in photometry, a correct or optimum exposure value cannot be obtained.

Accordingly, in a camera wherein the divided photometry mode and the central portion photometry mode can be selected, if the divided photometry mode is selected in such a camera including a taking lens having a large full-aperture F value (i.e., a full-aperture diameter is small), the optimum exposure cannot be obtained. This is particularly so tendency will be seen strongly when a bright focusing plate having strong orientation is used with the camera as in a recent case.

Further, in a conventional technique wherein the photometry modes can be changed over by means of the external selection means as mentioned above, since the operator can select the divided photometry mode or the central portion photometry mode optionally, if he selects the divided photometry mode in a camera including a taking lens which is a dark super telephoto lens having a large full-aperture F value, the following problem will arise. That is to say, since the lens is dark, the luminous flux from the object field cannot be introduced into the peripheries of the light receiving surfaces of the photometry means due to vignetting of the lens, so that the optimum exposure cannot be attained, with the result that the value of the exposure will be insufficient for the divided photometry.

SUMMARY OF THE INVENTION

Accordingly, an object of the present invention is to provide an exposure controlling apparatus for a camera, wherein a divided photometry mode or a central portion photometry mode is correctly selected in accordance with a full-aperture diameter of a taking lens, for correct photometry.

Another object of the present invention is to provide an exposure controlling apparatus for a camera, wherein a divided photometry mode or a central portion photometry mode can be automatically changed over on the basis of lens information of a taking lens, and wherein, when the central portion photometry mode is selected, extreme under-exposure can be prevented even if a high luminance or bright object is taken.

According to the present invention, an exposure controlling apparatus includes a divided photometry means for receiving light from an object through a taking lens and for performing photometry regarding an object field by dividing the object field into a plurality of areas, a central portion photometry means for receiving the light from the object through the taking lens and for performing photometry regarding a central portion of the object field, a lens information means for outputting lens information associated with a full-aperture of the taking lens, and an exposure value determination means, including a comparison circuit, for determining an exposure value in accordance with the lens information, on the basis of a photometry value from the central portion photometry means when it is discriminated that the full-aperture diameter is smaller than a predetermined critical full-aperture value and on the basis of a photometry value from the divided photometry means when it is discriminated that the full-aperture diameter is larger than the predetermined critical full-aperture value.

The exposure value determination means determines the exposure value on the basis of the photometry value from the central portion photometry means when it judges that the full-aperture diameter is smaller than the predetermined critical full-aperture value and on the basis of the photometry value from the divided photometry means when it judges that the full-aperture diameter is larger than the predetermined critical full-aperture value. Consequently, for example, when a taking lens having the full-aperture value smaller than the critical full-aperture value is mounted on the camera, even if the operator tries to perform the exposure operation by using the divided photometry at his will, the exposure operation is automatically performed by the central photometry mode, thus controlling the exposure value correctly.

Further, the exposure controlling apparatus according to the present invention is provided with a divided photometry means which can provide a divided photometry mode for performing photometry through a taking lens by dividing an object field corresponding to a picture into at least a central portion and a peripheral portion and a central portion photometry mode for performing photometry regarding the central portion of the picture, a selection means which can select the divided photometry mode or the central photometry mode through an external selection operation, a discrimination means for judging whether the divided photometry mode of the photometry means can be utilized or not, on the basis of at least lens information from the taking lens, a change-over means for automatically changing to the central portion photometry mode when the discrimination means judges that the divided photometry mode cannot be utilized while the divided photometry mode has been selected by the selection means, and a replacement means for replacing an exposure value calculated on the basis of the central portion photometry by a predetermined value when the exposure value exceeds the predetermined value after the central portion photometry mode has been changed by the change-over means.

With this arrangement, after the divided photometry mode has been selected, when the divided photometry mode is changed to the central portion photometry mode, since the exposure value is replaced by the predetermined value when the former exceeds the latter even in the case of a high luminance object extreme underexposure can be prevented.

Other objects, features and merits of the present invention will be apparent from the following explanation or description referring to the accompanying drawings.

DESCRIPTION OF THE PREFERRED EMBODIMENTS

A first embodiment of the present invention will now be explained with reference to FIGS. 1 and 2.

Figure 1:
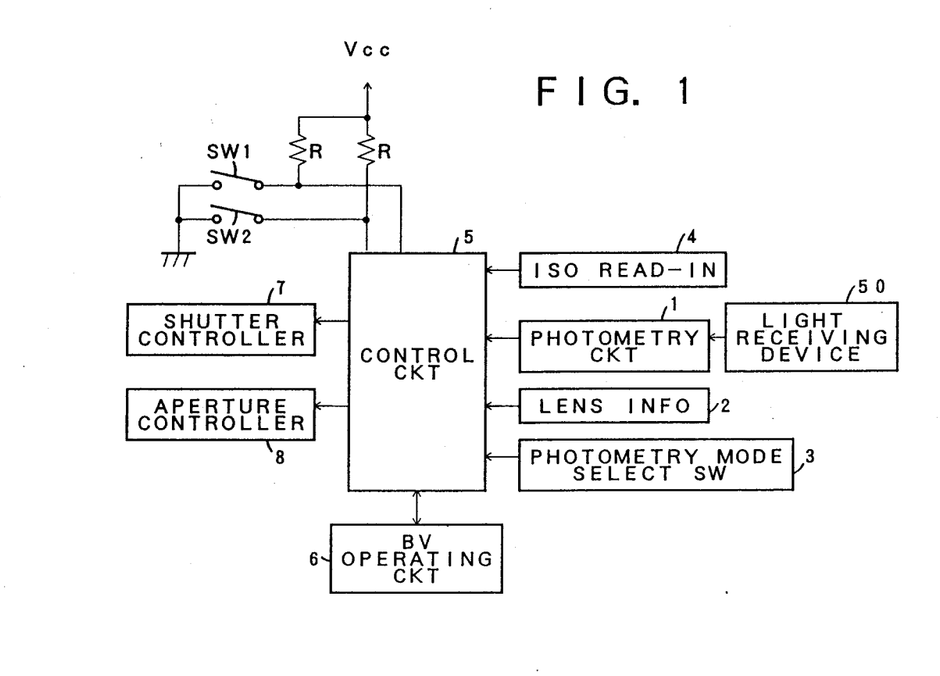
FIG. 1 is a block diagram showing a schematic construction of an exposure controlling apparatus according to a first embodiment of the present invention.
Figure 2:
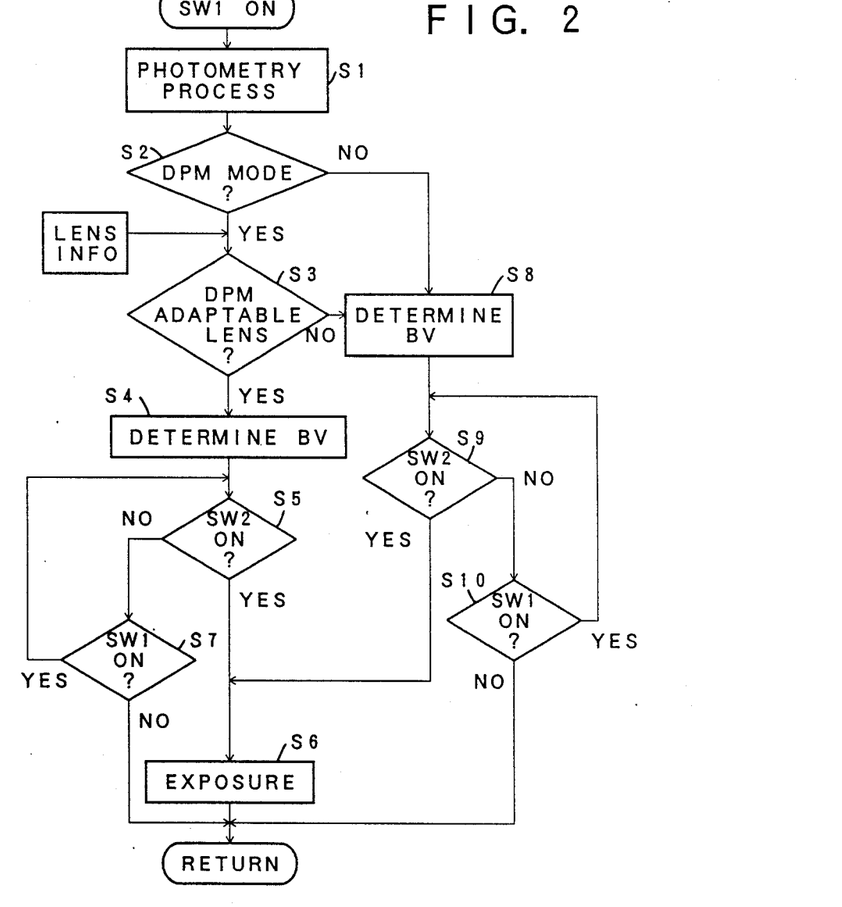
FIG. 2 is a flow chart showing a sequence for an exposure calculation regarding the exposure controlling apparatus according to the first embodiment.

FIG. 1 shows a whole construction of an exposure controlling apparatus. A photometry circuit 1 performs a well-known signal process such as logarithmic compression with respect to a photometry output of a five-divided light receiving device 50 (FIG. 8) and outputs luminance information corresponding to the respective divided areas of the light receiving device. A lens information output circuit 2 outputs lens information corresponding to a full-aperture diameter inputted from a taking lens (not shown) mounted on the camera. A photometry mode select switch 3 cooperates with an operation member (not shown) for selecting a divided photometry mode (DPM mode) or a central photometry mode (CPM mode) to output photometry mode information for discriminating the photometry modes. A film sensitivity or film speed read-in circuit 4 reads-in, for example, ISO sensitivity information of a film cartridge and outputs film sensitivity information. A control circuit 5 including CPU, ROM, RAM and the like reads-in various information from the above-mentioned circuits 1-4 and outputs the luminance information and film sensitivity information corresponding to the selected photometry mode to an exposure value operating circuit 6 in accordance with a process sequence which will be described later. The exposure value operating circuit 6 calculates an exposure value Bv in accordance with well-known algorithms on the basis of the inputted luminance information and film sensitivity information, and outputs the result to the control circuit 5. The control circuit 5 calculates a shutter speed value and an aperture value on the basis of the exposure value Bv, and outputs such control values to a shutter controller 7 and an aperture controller 8, respectively, thereby controlling the shutter and the aperture.

Further, a switch SW1 comprises a half-push switch which is turned ON upon half-pushing a release button, and a switch SW2 comprises a full-push switch which is turned ON upon full-pushing the release button.

Now, light paths of a photometry system and the light receiving device in a single lens reflex camera shown in FIGS. 7 and 8 will be explained.

Figure 8:
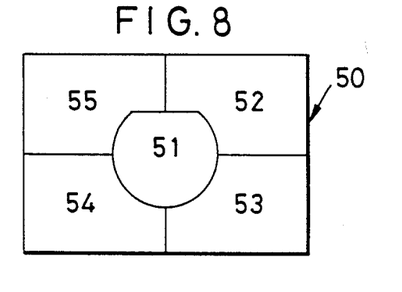
FIG. 8 is a plan view of a five-divided light receiving device.

The five-divided light receiving device 50 as shown in FIG. 8 is known as a photometry light receiving device used with such exposure controlling apparatus. Such five-divided light receiving device 50 includes a central light receiving element 51 and peripheral light receiving elements 52-55 arranged in correspondence to five areas obtained by dividing the object field into a single central area and four peripheral areas.

Figure 7:
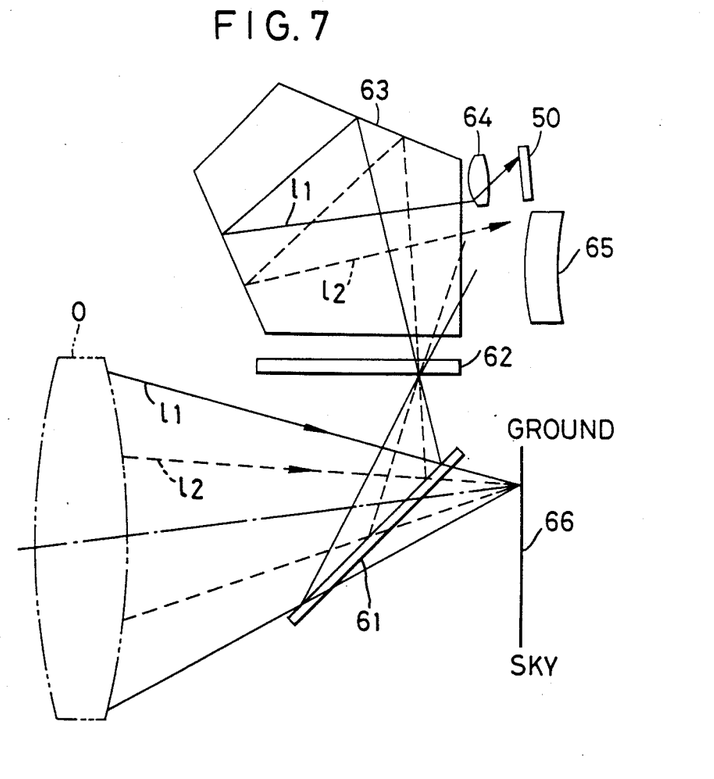
FIG. 7 is an explanatory view showing light paths of the photometry system in a single lens reflex camera incorporating a divided light receiving device therein.

FIG. 7 shows a photometry optical system in a TTL camera incorporating the above-mentioned five-divided light receiving device 50 therein, wherein object light introduced into a camera body through the taking lens 0 is reflected by a quick return mirror 61 to be focused on a focusing plate 62 and then is deflected by a pentaprism 63 to be passed through a condenser lens 64 and then reaches the five-divided light receiving device 50. Incidentally, the reference numeral 65 designates a finder eye piece, and the reference numeral 66 designates a film.

In an exposure controlling apparatus having the photometry optical system shown in FIG. 7, a technique is known in which, when the divided photometry mode is selected, the exposure value is calculated in accordance with a predetermined algorithm the basis of all of the outputs of the light receiving elements 51-55 and, when the central portion photometry mode is selected, the exposure value is calculated on the basis of a central part photometry using only the output of the central light receiving element 51 or on the basis of a center-weighted photometry using all of the outputs of the light receiving elements 51-55 and weighting a photometry value of a central portion. Incidentally, in the description in the specification, a central part photometry and a center-weighted photometry will merely be called "central portion photometry" generically.

Figure 9:
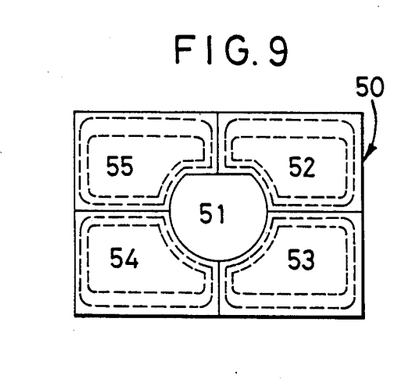
FIG. 9 shows distribution of sensitivity of the light receiving device when a full-aperture diameter of a taking lens is large in the photometry system of FIG. 7.
Figure 10:
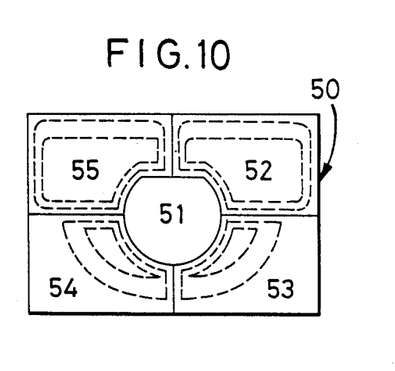
FIG. 10 shows distribution of sensitivity of the light receiving device when a full-aperture diameter of a taking lens is small in the photometry system of FIG. 7.

A solid line $l_1$ and a broken line $l_2$ in FIG. 7 show light paths of upper light beams of luminous flux off of an optical axis of the mounted taking lens at a ground side, where the line $l_1$ shows such light path when the full-aperture diameter of the taking lens is large, and the line $l_2$ shows such light path when the full-aperture diameter of the taking lens is small. The light beam $l_1$ is reflexed by the pentaprism 63 and then reaches the light receiving device 50 through the condenser lens 64. Accordingly, distribution of sensitivity on the light receiving device 50 will be uniform at the ground side 53, 54 as well as a sky side 52, 55, as shown in FIG. 9. However, the light beam $l_2$ does not reach the light receiving device 50, since the light beam deviates from the condenser lens 64 as shown in FIG. 7. Consequently, the distribution of sensitivity on the light receiving device 50 shows a condition in which photometry is not performed correctly lower areas at the ground side 53, 54 as shown in FIG. 10, with the result that the optimum exposure value cannot be obtained by means of the above-mentioned divided photometry.

That is to say, as mentioned above, in a camera wherein the operator can select the divided photometry mode or the central portion photometry mode performing the central portion photometry such as the central part photometry or the center-weighted photometry, when the divided photometry mode is selected in a case where the taking lens having the smaller full-aperture diameter is mounted, the optimum exposure value cannot often be obtained. This is particularly so when a bright focusing plate having strong orientation is used with the camera as in a recent case.

Thus, the photometry means having the construction according to the first embodiment shown in FIG. 1 is effective. Next, a process sequence of the exposure control circuit 5 according to the first embodiment will be explained with reference to a flow chart shown in FIG. 2.

When the switch SW1 actuated by the release button 9 is turned ON, such process sequence is executed, with the result that the photometry process is effected in a step S1, thus reading-in the luminance information of the respective photometry areas 51–55 from the photometry circuit 1. Next, in a step S2, it is judged whether the divided photometry mode (DPM mode) or the central portion photometry mode (CPM mode) is to be utilized on the basis of a signal representative of the photometry mode from the selection switch 3, and, if the divided photometry mode is determined, the sequence goes to a step S3. In the step S3, it is judged that the mounted taking lens can be used in the divided photometry or not on the basis of the lens information from the lens information output circuit 2. As mentioned above, since the correct exposure control cannot be effected, for example, when the light beam off of the optical axis of the taking lens (referred to as "off-axis light beam" hereinafter) among the object light does not reach the periphery of the object field due to the smaller full-aperture diameter, a critical full-aperture diameter within a range of which the off-axis light beam can be introduced into the periphery of the object field is previously determined, whereby the step S3 shows affirmative in the case where the taking lens has an aperture diameter larger than the critical full-aperture diameter. In this case, the sequence goes to a step S4. On the other hand, the step S3 shows negative in the case where the taking lens has an aperture diameter smaller than the critical full-aperture diameter. In this case, the sequence goes to a step S8.

In the step S4, the exposure value operating circuit 6 calculates the exposure value in accordance with the algorithm the divided photometry mode on the basis of the whole luminance information of the light receiving elements 51–55 and the film sensitivity information to obtain the exposure value Bv. Next, in a step S5, it is judged whether the full-push switch is turned ON or not, and if affirmative, in a step S6, the exposure is effected in a condition that the shutter and the aperture are set to the shutter speed value and the aperture value determined by the exposure value Bv, respectively, through the medium of the shutter controller 7 and the aperture controller 8. On the other hand, if the step S5 is negative, a step S7 judges whether the half-push switch SW1 is turned ON or not. If negative, the sequence returns to another sequence, and if affirmative, the sequence backs to the step S5.

On the other hand, when the step S2 is negative, since the central portion photometry mode is selected by the selection switch 3, in the step S8, the exposure value operating circuit 6 calculates the exposure value Bv on the basis of the luminance information and the film sensitivity information sought by the photometry value from the central light receiving element 51. Even when the divided photometry mode is selected, when the full-aperture diameter of the taking lens is smaller than the critical full-aperture diameter, the sequence also goes from the step S3 to the step S8, where the exposure value Bv is calculated. When the sequence goes from the step S8 to a step S9, it is judged whether the full-push button SW2 is ON or not, and if affirmative, the exposure is effected in the step S6 in the same manner as described above. On the other hand, when the step S9 is negative, a step S10 judges whether the half-push switch SW1 is ON or not, and if negative, the sequence returns to another sequence. On the other hand, if the step S10 is affirmative, the sequence backs to the step S9.

With the above-mentioned sequence, in the first embodiment of the present invention, even when the divided photometry mode is selected by the selection switch 3, if the full-aperture diameter of the taking lens is smaller than the predetermined critical full-aperture diameter, the exposure operation is effected by the central portion photometry mode.

Incidentally, in the first embodiment, while the full-aperture diameter itself was used as the lens information, a focal length, a position of an emission pupil of a lens, a reciprocal number of a position of an emission pupil of a lens and the like may be used as the lens information. That is to say, in the case where the focal length of the lens is used as the lens information, when the focal length is longer than a predetermined focal length, there is the possibility of not performing the correct divided photometry, and in the case where the position of the emission pupil of the lens is used as the lens information, there is the possibility of not performing the correct divided photometry when the position of the emission pupil is longer than a predetermined length. Further, in the case where the reciprocal number of the position of the emission pupil of the lens is used as the lens information, there is the possibility of not performing the correct divided photometry when the reciprocal number of the position of the emission pupil is longer than a predetermined length. The reason why the divided photometry may not be performed correctly in these cases is the same as the aforementioned reason in the case where the full-aperture diameter is used as the lens information.

Further, the lens is not limited to the single focus taking lens, but may be a zoom lens. In the case of the zoom lens, the present invention can be applied to a camera wherein the lenses cannot be changed. Furthermore, the division of the light receiving device is not limited to the illustrated embodiment, but the light receiving device may be divided into any number more than two and may be divided into any areas. In addition, while the divided photometry light receiving device shown in FIG. 8 was used both in the divided photometry and central portion photometry, a central portion photometry light receiving device may be provided independently from the divided photometry light receiving device, so that, when the central portion photometry mode is selected, the exposure value can be calculated on a photometry value from the central portion photometry light receiving device. Further, while the central portion photometry was explained as the central part photometry wherein the exposure value was calculated on the basis of the photometry value from the central light receiving element 51, the exposure value may be calculated on the basis of the center-weighted photometry.

According to the first embodiment of the present invention, since the exposure value is determined on the basis of the photometry value from the central portion photometry means when the full-aperture diameter is smaller than the predetermined critical full-aperture diameter and on the basis of the photometry value from the divided photometry means when the full-aperture diameter is larger than the predetermined critical full-aperture diameter, in a taking lens having a full-aperture diameter so small that the off-axis of light beam of the object light cannot reach the peripheral area of the object field, the exposure value can automatically be calculated on the basis of the central portion photometry, thus performing the correct exposure control.

Next, a second embodiment of the present invention shown in FIGS. 3 to 6 will be explained. Structural elements having equivalent functions to those shown in FIG. 1 will be designated by the same reference numerals.

Figure 3:
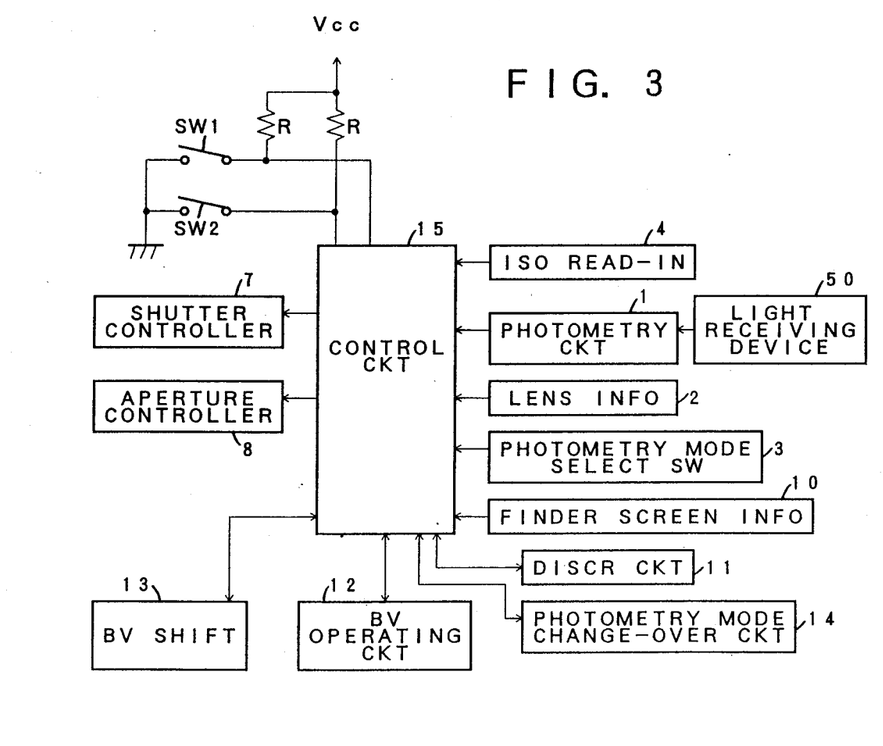
FIG. 3 is a block diagram showing a schematic construction of an exposure controlling apparatus according to a second embodiment of the present invention.

In FIG. 3, an exposure controlling apparatus for a camera comprises a microcomputer (referred to as CPU hereinafter) 15, and various circuits and elements which are controlled by the CPU 15 and which will be described below.

More particularly, a switch SW1 is turned ON upon half-pushing the release button to supply the CPU 15. A switch SW2 is turned ON upon full-pushing the release button to activate the CPU 15 for exposure control.

A film sensitivity read-in circuit 4 reads-in the film sensitivity of a film 66 mounted to the camera body and outputs film sensitivity information to the CPU 15.

A photometry light receiving device 50 is divided into five areas as shown in FIG. 8 and is arranged, for example, in a finder of the camera and serves to receive incident object light through a taking lens and the finder. A photometry circuit 1 outputs respective luminance data of the respective areas of the five-divided light receiving device 50 to the CPU 15 as photometry information.

A lens information output circuit 2 outputs a full-aperture F value ($F_0$), focal length (f), distance of an emission pupil ($P_0$), or a reciprocal number of the distance of the emission pupil ($1/P_0$) of the taking lens mounted on the camera body to the CPU 15 as lens information.

A finder screen information output circuit 10 outputs finder screen information such as diffusivity or permeability of a finder screen 62 mounted on the camera body to the CPU 15.

A photometry mode selection switch 3 is provided on the camera body for being actuated by an external operation, so that the operator can select a divided photometry (here, conventional multi-pattern photometry) mode (DPM mode) or a central portion photometry (here, conventional center-weighted photometry) mode (CPM mode). When the divided photometry mode is selected, the luminance data of the five areas of the photometry light receiving device 50 (light receiving surfaces 51-55 in FIG. 8) are respectively operated or calculated of the basis of a predetermined algorithm by means of an exposure value operating circuit 12 through the CPU 15, thus obtaining the exposure value. On the other hand, when the central portion photometry mode is selected, the exposure value is calculated on the basis of the luminance data of the central area (light receiving surface 51) of the light receiving device 50 by means of the exposure value operating circuit 12 through the CPU 15.

A discrimination circuit 11 judges whether the multi-pattern photometry is adaptable or not, on the basis of the full-aperture F value of the taking lens outputted from the lens information output circuit 2. That is to say, when the taking lens is dark and has a large full-aperture F value, since a portion of luminous flux does not reach the peripheries of the light receiving surfaces of the light receiving device 50 due to the vignetting of the lens, so that there are incorrect luminance data, it is impossible to perform the multi-pattern photometry. To the contrary, when the taking lens is bright and has a small full-aperture F value, it is possible to perform the multi-pattern photometry.

A photometry mode change-over circuit 14 outputs a change-over signal for automatically changing over the divided photometry mode to the central portion photometry mode to the CPU 15, when the discrimination circuit 11 judges that the multi-pattern photometry is not adaptable while the divided photometry is being performed by selecting the divided photometry mode through the photometry mode selection switch 3.

A luminance or brightness shift circuit 13 replaces the exposure value sought in the exposure value operating circuit 12 by a predetermined value and outputs the predetermined value to the CPU 15, as will be described later, when the exposure value exceeds the predetermined value after the divided photometry mode has been changed to the central portion photometry mode through the discrimination circuit 11 and the photometry mode change-over circuit 14. And, a shutter controller 7 and an aperture controller 8 are activated in accordance with the exposure value outputted from the luminance shift circuit 13 to control a shutter and an aperture, respectively.

Figure 4:
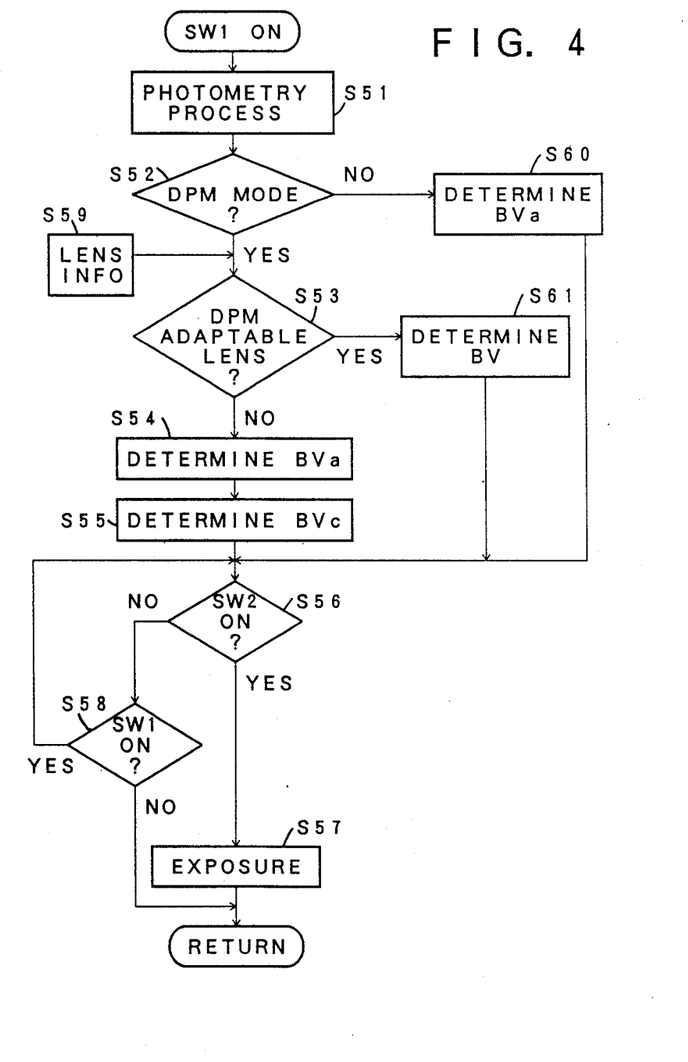
FIG. 4 is a flow chart showing a sequence for an exposure calculation regarding the exposure controlling apparatus according to the second embodiment.

Next, an operation of the CPU 15 will be explained with reference to a flow chart shown in FIG. 4.

When the half-push switch SW1 is turned ON to supply the CPU 15, the operation is initiated.

In a step S51, the photometry information is inputted from the photometry circuit 1 to the CPU, thus receiving the luminance data of the respective light receiving surfaces 51–55 of the light receiving device 50.

Figure 5:
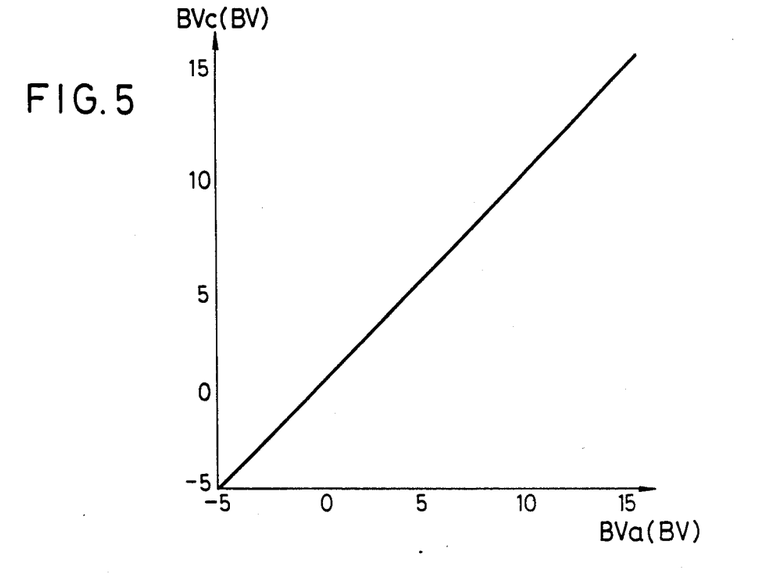
FIG. 5 is an explanatory graph showing a relation between exposure values BVa and BVc when a central portion photometry mode is selected.
Figure 11:
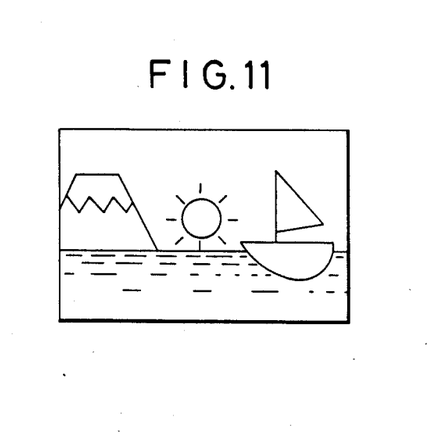
FIG. 11 an explanatory view of a picture field of the camera corresponding to the light receiving device.

In a step S52, it is judged whether the operator has select the divided photometry mode through the photometry mode selection switch 3 or not. If the divided photometry mode is not selected, the sequence goes to a step S60, where the operation of the luminance shift circuit 13 is inhibited and the central portion photometry command is outputted, thus sending the luminance data of the central light receiving surface 51 of the light receiving device 50 to the exposure value operating circuit 12 to calculate the exposure value BVa. And, when the full-push switch is turned ON in a step S56, in a step S57, the CPU 15 controls the exposure on the basis of the exposure value BVa while taking a photograph. In this way, when the central portion photometry mode is selected through the photometry mode selection switch 3, as shown in FIG. 5, the exposure value BVa sought in the exposure value operating circuit 12 will be equal to an exposure value BVc used for controlling (a value by which the CPU 15 controls the shutter controller 7 and the aperture controller 8), and, therefore, the exposure is controlled on the basis of the exposure value BVa itself sought in the exposure value operating circuit 12. In this case, in a condition that the sunlight is directly introduced into the camera as in an object field shown in FIG. 11, it is feared that a mountain and/or a yacht in the field are subject to extreme under exposure. However, since the operator selects the central portion photometry mode at his will, the high luminance side of the exposure value BVc used for controlling the exposure is restrained or regulated, thus controlling the exposure so as not to provide extreme under exposure regarding main objects (mountain and yacht).

On the other hand, when the divided photometry mode is selected in the step S52, the sequence goes to a step S53, where it is judged whether the multi-pattern photometry is adaptable or not, on the basis of the lens information inputted from the lens information output circuit 2 at a step S59.

When the taking lens is bright in the step S53, the sequence goes to a step S61, where the five luminance data from the photometry circuit 1 are sent to the exposure value operating circuit 12 and the exposure value is calculated on the basis of the multi-pattern photometry through the exposure value operating circuit 12. And, when the full-push switch SW2 is turned ON in a step S56, the exposure control is performed while taking a photograph in a step S57.

On the other hand, when the taking lens is dark in the step S53, the sequence goes to a step S54, where the photometry mode change-over circuit 14 is activated to automatically change the divided photometry mode to the central portion photometry mode, thus causing the exposure value operating circuit 12 to perform the exposure operation to obtain the exposure value BVa. And then, the sequence goes to a step S55.

Figure 6:
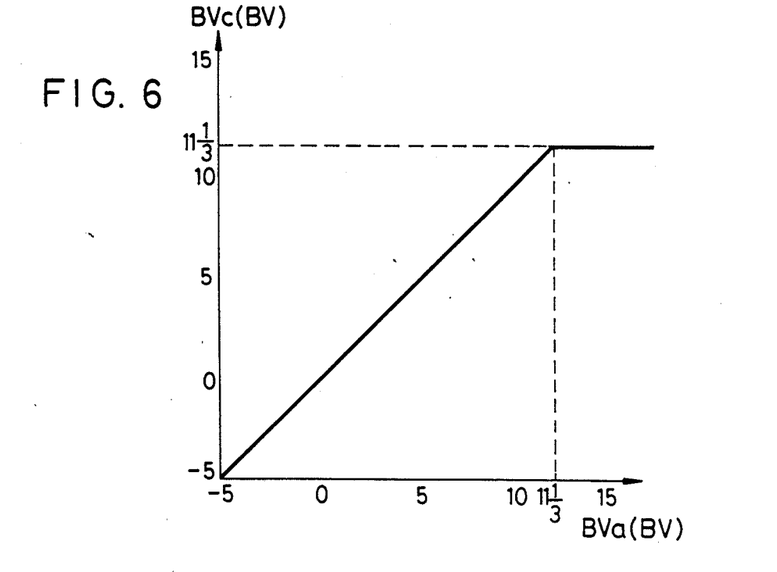
FIG. 6 is an explanatory graph showing a relation between exposure values BVa and BVc in a central portion photometry mode when a divided photometry mode is changed to the central portion photometry mode.

In the step S55, the exposure value BVc for the exposure control is sought. That is to say, as shown in FIG. 6, in association with the exposure value BVa calculated in the exposure value operating circuit 12, the exposure value BVc used for controlling the exposure is sought. Here, the exposure value BVc for the exposure control is so set that the exposure value BVc corresponds to the exposure value BVa at a ratio of 1:1 when the latter value BVa is below $11\frac{1}{3}$ and that the exposure value BVc is regulated to a constant value of $11\frac{1}{3}$ when the exposure value BVa exceeds the value of $11\frac{1}{3}$.

With this construction, unlike the above-mentioned condition in which the operator can select either one of the both modes optionally, when the multi-pattern photometry mode is automatically changed to the central portion photometry mode while the operator is taking a photograph with the multi-pattern photometry, an obtained picture has no undesirable exposure. In this case, when the divided photometry mode has automatically been changed to the central portion photometry mode at the camera side, for example, even in the condition that the sunlight is directly introduced into the camera as in the object field shown in FIG. 11, in order to prevent extreme under exposure of the mountain and/or yacht in the obtained picture, the high luminance side (the exposure value BVa $\leq 11\frac{1}{3}$ BV) of the exposure value BVc for the exposure control is regulated to a fixed value of $11\frac{1}{3}$ BV.

When the full-push switch SW2 is turned ON in the step S56, in the step S57, the exposure is controlled while taking a photograph on the basis of the exposure value BVc set in the step S55.

We claim:

1. An exposure controlling apparatus for a camera, comprising:

a divided photometry means for performing photometry regarding an object field through a taking lens by dividing said object field into a plurality of areas;

a central portion photometry means for performing photometry regarding a central area of said object field through the taking lens;

a lens information output means for outputting lens information representative of a quantitative optical feature of said taking lens;

a comparison means, including reference value information, for comparing said lens information with said reference value information; and an exposure determination means, responsive to said comparison means, for determining an exposure value regarding said object field in accordance with said divided photometry means when said lens information does not exceed said reference value information, and for determining an exposure value regarding said object field in accordance with said central portion photometry means when said lens information exceeds said reference value information.

2. An exposure controlling apparatus according to claim 1, wherein said central portion photometry means includes a central light receiving element for performing photometry regarding the central area of said object field, and said divided photometry means includes said central light receiving element and peripheral light receiving elements for performing photometry regarding peripheral areas of said object field.

3. An exposure controlling apparatus according to claim 1, wherein said lens information output means outputs information regarding a minimum aperture value of said taking lens, and said exposure determination means determines the exposure value regarding said object field in accordance with said divided photometry means when said minimum aperture value of said taking lens is smaller than a predetermined value.

4. An exposure controlling apparatus according to claim 1, wherein said lens information output means outputs information regarding a focal length of said taking lens, and said exposure determination means determines the exposure value regarding said object field in accordance with said divided photometry means when said focal length is shorter than a predetermined length.

5. An exposure controlling apparatus according to claim 1, wherein said lens information output means outputs information regarding a distance to an emission pupil of said taking lens, and said exposure determination means determines the exposure value regarding said object field in accordance with said divided photometry means when said distance to said emission pupil is shorter than a predetermined distance.

6. An exposure controlling apparatus according to claim 1, wherein said lens information output means outputs information regarding a reciprocal number of a distance to an emission pupil of said taking lens, and said exposure determination means determines the exposure value regarding said object field in accordance with said divided photometry means when said reciprocal number of the distance to said emission pupil is larger than a predetermined value.

7. An exposure controlling apparatus for a camera, comprising:
   a photometry means having divided photometry for performing photometry regarding an object field corresponding to a picture through a taking lens by dividing said object field into at least a central portion and peripheral portions and central portion photometry for performing photometry regarding the central portion of said object field through the taking lens;
   a selection means operated to select said divided photometry or said central portion photometry of said photometry means;
   a discrimination means for discriminating whether said divided photometry of said photometry means is adaptable or not, on the basis of at least lens information from said taking lens;
   a change-over means for automatically changing said divided photometry to said central portion photometry when it judges that said divided photometry is not adaptable after said divided photometry is selected by said selection means; and
   a replacement means for replacing an exposure value determined in accordance with said central portion photometry by a second predetermined value when said determined exposure value exceeds a first predetermined value after said divided photometry has been changed to said central portion photometry by means of said change-over means.

8. An exposure controlling apparatus according to claim 7, wherein said central portion photometry by means of said photometry means performs photometry with sensitivity of the central portion of said picture higher than that of the peripheral portion thereof.

9. An exposure controlling apparatus according to claim 7, further including means for inhibiting operation of said replacement means when said central portion photometry is selected by said selection means.

10. An exposure controlling apparatus according to claim 7, wherein said first predetermined value has the same value as said second predetermined value.

11. An exposure controlling apparatus according to claim 7, wherein said lens information is information regarding a minimum aperture value of said taking lens, and said discrimination means judges that said divided photometry is not adaptable when said minimum aperture value of said taking lens is larger than a predetermined aperture value.

12. An exposure controlling apparatus according to claim 7, wherein said lens information is information regarding a focal length of said taking lens, and said discrimination means judges that said divided photometry is not adaptable when said focal length is longer than a predetermined length.

13. An exposure controlling apparatus according to claim 7, wherein said lens information is information regarding a distance to an emission pupil of said taking lens, and said discrimination means judges that said divided photometry is not adaptable when said distance to the emission pupil is longer than a predetermined distance.

14. An exposure controlling apparatus according to claim 7, wherein said lens information is information regarding a reciprocal number of a distance to an emission pupil of said taking lens, and said discrimination means judges that said divided photometry is not adaptable when said reciprocal number of the distance to the emission pupil is smaller than a predetermined value.

* * * * *